US007291316B2

(12) United States Patent
Meikrantz et al.

(10) Patent No.: US 7,291,316 B2
(45) Date of Patent: Nov. 6, 2007

(54) CESIUM AND STRONTIUM EXTRACTION USING A MIXED EXTRACTANT SOLVENT INCLUDING CROWN ETHER AND CALIXARENE EXTRACTANTS

(75) Inventors: David H. Meikrantz, Idaho Falls, ID (US); Terry A. Todd, Aberdeen, ID (US); Catherine L. Riddle, Idaho Falls, ID (US); Jack D. Law, Pocatello, ID (US); Dean R. Peterman, Idaho Falls, ID (US); Bruce J. Mincher, Idaho Falls, ID (US); Christopher A. McGrath, Blackfoot, ID (US); John D. Baker, Blackfoot, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 511 days.

(21) Appl. No.: 10/808,039

(22) Filed: Mar. 23, 2004

(65) Prior Publication Data

US 2005/0211955 A1 Sep. 29, 2005

(51) Int. Cl.
*C02F 1/26* (2006.01)
*C02F 1/68* (2006.01)
*G21F 9/06* (2006.01)

(52) U.S. Cl. .................. 423/2; 423/157; 423/181; 210/682; 588/20

(58) Field of Classification Search .............. 423/2, 423/157, 181; 210/682; 588/20
See application file for complete search history.

(56) References Cited

U.S. PATENT DOCUMENTS

| | | | |
|---|---|---|---|
| 4,749,518 A | | 6/1988 | Davis, Jr. et al. |
| 5,100,585 A | * | 3/1992 | Horwitz et al. ............ 423/2 |
| 5,344,623 A | | 9/1994 | Horwitz et al. |
| 5,346,618 A | | 9/1994 | Horwitz et al. |
| 5,393,892 A | | 2/1995 | Krakowiak et al. |
| 5,478,953 A | | 12/1995 | Gula et al. |
| 5,607,591 A | | 3/1997 | Dozol et al. |
| 5,666,641 A | | 9/1997 | Abney et al. |
| 5,666,642 A | | 9/1997 | Hawthorne et al. |
| 5,698,169 A | | 12/1997 | Hawthorne et al. |
| 5,866,087 A | | 2/1999 | Dozol et al. |
| 5,888,398 A | | 3/1999 | Dietz et al. |
| 5,926,687 A | | 7/1999 | Dozol et al. |
| 6,040,462 A | | 3/2000 | Oh et al. |
| 6,156,282 A | | 12/2000 | Dozol et al. |
| 6,174,503 B1 | | 1/2001 | Moyer et al. |
| 6,214,234 B1 | * | 4/2001 | Harjula et al. ............ 210/682 |
| 6,258,333 B1 | | 7/2001 | Romanovskiy et al. |
| 6,270,737 B1 | | 8/2001 | Zaitsev et al. |
| 6,312,653 B1 | | 11/2001 | Delmau et al. |
| 6,468,445 B2 | | 10/2002 | Romanovskiy et al. |
| 6,511,603 B1 | | 1/2003 | Dietz et al. |
| 6,566,561 B1 | | 5/2003 | Bonnesen et al. |
| 6,709,642 B1 | | 3/2004 | Dozol et al. |
| 2001/0033814 A1 | | 10/2001 | Romanovskiy et al. |

FOREIGN PATENT DOCUMENTS

SU 1706661 A1 9/1991

OTHER PUBLICATIONS

Bonnesen et al., "Alkaline-Side Extraction of Cesium from Savannah River Tank Waste Using a Calixarene-Crown Ether Extractant," ORNL/TM-13704, Oak Ridge National Laboratory: Oak ridge, TN, pp. ii-102 (Dec. 1998).
Bonnesen et al., "Development of Process Chemistry for the Removal of Cesium from Acidic Nuclear Waste by Calix[4]arene-crown-6 Ethers," ACS Sym Ser. 757 (Calixarenes for Separations), Am. Chem. Soc. pp. 26-44 (2000).
Chiarizia et al., "Composition of the Organic Phase Species in the Synergistic Extraction of $Sr^{2+}$ by Mixtures of Di(2-Ethylhexyl) Alkylenediphosphonic Acids and Dicyclohexano-18-crown-6," Solvent Extr. and Ion Exch., 21(2):171-197 (2003).
Dietz et al., "Extraction of Strontium from Acidic Nitrate Media Using a Modified PUREX Solvent," Solvent Extr. and Ion Exch., 13(1), 1-17 (1995).
Dietz et al., "Substituent Effects in the Extraction of Cesium from Acidic Nitrate Media With Macrocyclic Polyethers," Solvent Extr. and Ion Exch., 14(3), 357-384 (1996).
Dozol et al., "A Solution for Cesium Removal from High-Salinity Acidic or Alkaline Liquid Waste: The Crown Calix[4]Arenes," Sep. Sci. and Technol., 34(6&7):877-909 (1999).
Duchemin et al., "Solvatochromic Solvent Polarity Measurements of Alcohol Solvent Modifiers and Correlation with Cesium Extraction Strength," Solvent Extr. and Ion Exch., 19(6):1037-1058 (2001).
Gupta, et al., "Effect of Diluents on the Extraction of $Sr^{2+}$ from $HNO_3$ Solutions with Dicyclohexano-18-crown-6," Solvent Extr. and Ion Exch., 21(1), 53-71 (2003).
Herbst et al., "Development and Testing of a Cobalt Dicarbollide Based Solvent Extraction Process for the Separation of Cesium and Strontium from Acidic Tank Waste," Sep. Sci. and Technol., 37(8), 1807-1831 (2002).

(Continued)

*Primary Examiner*—Timothy C. Vanoy
(74) *Attorney, Agent, or Firm*—Trask Britt

(57) ABSTRACT

A mixed extractant solvent including calix[4]arene-bis-(tert-octylbenzo)-crown-6 ("BOBCalixC6"), 4',4',(5')-di-(t-butyl-dicyclo-hexano)-18-crown-6 ("DtBu18C6"), and at least one modifier dissolved in a diluent. The mixed extractant solvent may be used to remove cesium and strontium from an acidic solution. The DtBu18C6 may be present from approximately 0.01 M to approximately 0.4M, such as from approximately 0.086 M to approximately 0.108 M. The modifier may be 1-(2,2,3,3-tetrafluoropropoxy)-3-(4-sec-butylphenoxy)-2-propanol ("Cs-7SB") and may be present from approximately 0.01M to approximately 0.8M. In one embodiment, the mixed extractant solvent includes approximately 0.15M DtBu18C6, approximately 0.007M BOBCalixC6, and approximately 0.75M Cs-7SB modifier dissolved in an isoparaffinic hydrocarbon diluent. The mixed extractant solvent may form an organic phase in an extraction system that also includes an aqueous phase. Methods of extracting cesium and strontium as well as strontium alone are also disclosed.

21 Claims, 3 Drawing Sheets

OTHER PUBLICATIONS

Horwitz et al., "SREX: A New Process for the Extraction and Recovery of Strontium From Acidic Nuclear Waste Streams," Solvent Extr. and Ion Exch., 9(1):1-25 (1991).

Lamb et al., "Novel Solvent System for Metal Ion Separation: Improved Solvent Extraction of Strontium(II) and Lead (II) as Dicyclohexano-18-crown-6 Complexes," Sep. Sci. and Technol., 34(13) :2583-2599 (1999).

Leonard et al., "Development of a Solvent Extraction Process for Cesium Removal From SRS Tank Waste," Sep. Sci. and Technol., 36(5-6):743-766 (2001).

Leonard et al., "Experimental Verification of Caustic-Side Solvent Extraction for Removal of Cesium from Tank Waste," Solvent Extr. and Ion Exch. 21(4) :505-526 (2003).

Moyer et al., "Complexation of Strontium in the Synergistic Extraction System Dicyclohexano-18-Crown-6, Versatic Acid, Carbon Tetrachloride," Solvent Ext. and Ion Exch., 4(1), 83-93 (1986).

Norato et al., "Demonstration of the Caustic-Side Solvent Extraction Process for the Removal of $^{137}$Cs from Savannah River Site High Level Waste," Sep. Sci. and Technol., 38(12-13):2647-2666 (2003).

Sachleben et al., "Surveying the Extraction of Cesium Nitrate by 1,3-Alternate Calix[4]Arene Crown-6 Ethers in 1,2-Dichloroethane," Solvent Ext. and Ion Exch., 17(6), 1445-1459 (1999).

Shehata, F.A., "Extraction of Strontium from Nitric Acid Solutions by Selected Crown Ethers," J. of Radioanalytical and Nuclear Chem., Articles, 185(2) 411-417 (1994).

Tanigawa et al., "Solvent Extraction of Alkali Metals by Crown Ethers," Chem. Eng. J, 39:157-168 (1988).

White et al., "Stability Study of Cs Extraction Solvent," Sep. Sci. and Technol., 38(12-13):2667-2683 (2003).

Wood et al., "Effect of the Interference of Alkali and Alkaline Earth Metal Ions on the Extraction of $^{90}SR$ From Acidic Nuclear Waste Solutions by 18-crown-6 Derivatives," Solvent Ext. and Ion Exch., 13(5), 829-844 (1995).

Wood et al., "Extraction of Lead and Strontium from Hazardous Waste Streams by Solvent Extraction with 4',4',(5')-D1-(T-Butyldicyclohexo)-18-crown-6," Solvent Ext. and Ion Exch., 15(1), 65-78 (1997).

Zirnhelt et al., "Strontium Extraction with a Polymer-Bound 18-Crown-6 Polyether," Sep. Sci. and Technol., 28 (15&16):2419-2429 (1993).

Delmau et al., "Combined Extraction of Cesium and Strontium from Alkaline Nitrate Solutions," Solvent Extr. Ion Exch. 24:197-217 (2006).

Bonnesen et al., "A robust alkaline-side CSEX solvent suitable for removing cesium from Savannah River high level waste," Solvent Extr. Ion Exch. 2000, 18(6) 1079-1107.

Bonnesen et al., "Development of effective solvent modifiers for the solvent extraction of cesium from alkaline high-level tank waste," Solvent Extr. Ion Exch. 2003, 21(2) 141-170.

Moyer et al., "Caustic-side solvent extraction chemical and physical properties: Progress in FY 2000 and FY 2001," Report ORNL/TM-2001/285, Oak Ridge National Laboratory: Oak Ridge, TN, Feb. 2002.

\* cited by examiner

CESIUM AND STRONTIUM EXTRACTION USING A MIXED EXTRACTANT SOLVENT INCLUDING CROWN ETHER AND CALIXARENE EXTRACTANTS

GOVERNMENT RIGHTS

The United States Government has rights in the following invention pursuant to Contract No. DE-AC07-99ID13727 between the U.S. Department of Energy and Bechtel BWXT Idaho, LLC.

FIELD OF THE INVENTION

The present invention relates to separating cesium and strontium from an acidic solution. More specifically, the present invention relates to simultaneously separating cesium and strontium from the acidic solution using a mixed extractant solvent.

BACKGROUND OF THE INVENTION

Cesium-137, strontium-90, and actinides account for a significant amount of the radioactivity of liquid wastes, such as high level liquid wastes from nuclear fuel reprocessing. Cesium-137 and strontium-90 account for over 99.9% of the relative toxicity of the liquid waste once the actinides have been removed. Cesium-137 has a halflife ("$t_{1/2}$") of 30 years and strontium-90 has a $t_{1/2}$ of 29 years. This liquid waste is extremely hazardous and expensive to dispose of. To increase safe handling of the majority of the liquid waste and to significantly reduce its storage and disposal cost, the liquid waste is separated into two portions: one containing the majority of the radioactive components and one containing the bulk of the non-radioactive components. Removing the radioactive components allows the liquid waste to be decategorized and disposed of in geological formations after vitrification. Currently, separate technologies are used to remove the actinides and fission products from the liquid waste and, often times, separate processes are used to remove specific radionuclides, such as cesium and strontium.

The ability to remove and recover cesium and strontium from spent nuclear fuel waste represents a significant issue regarding short term heat loading in a geological repository. Cesium and strontium are major heat generators in the liquid waste and produce gamma and beta radiation. Removing the cesium-137 and strontium-90 would enable these radionuclides to be stored in a short-term waste facility, enabling long-term storage facilities to store waste closer together by eliminating some of the heat load.

Liquid extraction, sorption, and coprecipitation methods have been used to remove cesium or strontium from nuclear acidic waste solutions or related alkaline wastes. Numerous extractants have been identified that extract cesium or strontium from alkaline solutions or acidic solutions. The extractants are typically separate solvents that are designed to remove one of these radionuclides. For instance, crown ether compounds or calixarene crown ether compounds have been used to extract cesium. U.S. Pat. No. 6,174,503 to Moyer et al., U.S. Pat. No. 6,566,561 to Bonnesen et al., Duchemin et al., Solvent Extr. And Ion Exch., 19(6):1037-1058 (2001), Leonard et al., Solvent Extr. And Ion Exch., 21(4):505-526 (2003), Leonard et al., Sep. Sci. and Technol., 36(5-6):743-766 (2001), White et al., Sep. Sci. and Technol., 38(12-13): 2667-2683 (2003), and Norato et al., Sep. Sci. and Technol., 38(12-13):2647-2666 (2003) disclose extracting cesium from alkaline solutions using calix[4]arene-crown ether compounds. The calix[4]arene-crown ether compounds and modifiers are dissolved in a diluent. The calixarene is calix[4]arene-bis-(tert-octylbenzo)-crown-6 ("BOB-CalixC6"). Strontium is removed from the alkaline solutions in a separate process using monosodium titanate. One specific extractant includes 0.007M BOBCalixC6, 0.750M 1-(2,2,3,3-tetrafluoro-propoxy)-3-(4-sec-butylphenoy)-2-propanol ("Cs-7SB"), 0.003 M trioctylamine ("TOA"), and Isopar® L and is referred to herein as the caustic-side solvent extraction ("CSSX") solvent. The CSSX solvent provides a forward distribution ratio or coefficient for cesium ("$D_{Cs}$") of 8.0 from a 1M nitric acid solution. Another specific extractant includes 0.01M BOBCalixC6, 0.5M Cs-7SB, 0.001 M TOA, and Isopar® L.

U.S. Pat. No. 5,926,687 to Dozol et al. and Bonnesen et al., "Development of Process Chemistry for the Removal of Cesium from Acidic Nuclear Waste by Calix[4]arene-crown-6 ethers," ACS Sym. Ser. 757 (Calixarenes for Separations), 26-44 (2000) disclose extracting cesium from acidic solutions using calix[4]arene-crown ether compounds. While the tested calix[4]arene-crown ether compounds have high distribution coefficients for cesium, they have low distribution coefficients for strontium. Various calix[4]arene-crown ether compounds and modifiers were tested because the stability of the calix[4]arene-crown ether compounds and modifiers differed in each of these solutions. In Dozol et al., Sep. Sci. and Technol., 34(6&7):877-909 (1999), monocrown or biscrown calix[4]arenes in a 1,3 alternative cone conformation are disclosed to remove cesium from acidic or alkaline solutions.

U.S. Pat. No. 5,888,398 to Dietz et al. discloses using an 18-crown-6-ether to extract cesium from acidic solutions. The 18-crown-6-ether selectively extracts cesium over other ions, such as hydrogen, aluminum, calcium, boron, and strontium.

U.S. Pat. Nos. 5,344,623 and 5,346,618 to Horwitz et al., U.S. Pat. No. 6,511,603 to Dietz et al., Lamb et al., "Novel Solvent System for Metal Ion Separation: Improved Solvent Extraction of Strontium(II) and Lead (II) as Dicyclohexano-18-crown-6 Complexes," Sep. Sci. and Technol., 34(13): 2583-2599 (1999), Chiarizia et al., "Composition of the Organic Phase Species in the Synergistic Extraction of $Sr^{2+}$ by Mixtures of Di(2-Ethylhexyl)Alkylenediphosphonic Acids and Dicyclohexano-18-crown-6," Solvent Extr. And Ion Exch., 21(2):171-197 (2003), and Tanigawa et al., Chem. Eng. J. 39:157-168 (1988) disclose extracting strontium from an acidic solution using crown ethers. One specific extractant includes a mixture of 0.15M 4',4',(5')-di-(t-butyldicyclo-hexano)-18-crown-6 ("DtBu18C6") and 1.2M tri-n-butyl phosphate ("TBP") in Isopar®L and is referred to herein as the strontium extraction ("SREX") solvent, as described in Horowitz et al., Solvent Extr. And Ion Exch., 9(1):1-25 (1991). The SREX solvent provides a distribution ratio or coefficient for strontium ("$D_{Sr}$") of 0.7 from a 1M nitric acid solution.

However, using separate extractants to remove the cesium and strontium is disadvantageous in regard to environmental concerns, safety, simplicity and effectiveness of processing, and undesirable generation of secondary waste.

Methods of extracting both cesium and strontium have also been disclosed. In U.S. Pat. No. 4,749,518 to Davis et al., cesium is extracted from acidified nuclear waste with bis 4,4'(5) [1-hydroxy-2-ethylhexyl]benzo 18-crown-6 and a cation exchanger. The strontium is then extracted using bis 4,4'(5') [1-hydroxyheptyl]cyclohexo 18-crown-6 and a cation exchanger. In U.S. Pat. No. 5,393,892 to Krakowiak et al., a method of removing alkali metal and alkaline earth metals is disclosed. A solid inorganic support having a ligand covalently bonded thereto is contacted with a solution including the alkali metal and alkaline earth metals. The ligand is an oxygen donor macrocyclic polyether cryptand that selectively removes the alkali metal and alkaline earth metals. In U.S. Pat. No. 5,666,641 to Abney et al., a polymeric material including a polymer and a plasticizer is used to extract cesium and strontium. In U.S. Pat. No. 5,666,642 to Hawthorne et al., metal dicarbollide ion complexes are used to remove cesium and strontium from an aqueous fission product waste solution. The metal dicarbollide ion complexes are used to sequentially remove the cesium and then the strontium. In Horwitz et al., International Solvent Extraction Committee '96, "A Combined Cesium-Strontium Extraction/Recovery Process," p. 1285-1290 (1996), an extraction process using di-t-butylcyclo-hexano-18-crown-6 and a macrocyclic polyether are disclosed to simultaneously extract cesium and strontium.

In addition, a large scale demonstration of concurrent cesium and strontium partitioning from defense-related nuclear waste was performed in Russia using a cobalt dicarbollide extraction process. In U.S. Pat. No. 6,270,737 to Zaitsev et al., a composition of a complex organoboron compound and polyethylene glycol in an organofluorane diluent is used to extract cesium and strontium. The complex organoboron compound is a halogenated cobalt dicarbollide. In U.S. Pat. No. 6,258,333 to Romanovskiy et al., a composition of a complex organoboron compound, polyethylene glycol, and a neutral organophosphorus compound in a diluent is used to simultaneously extract cesium and strontium. The complex organoboron compound is a halogenated cobalt dicarbollide. However, this extraction process uses multiple chemicals and, therefore, adds significant volume to the waste volume produced by the extraction process.

It is desirable to develop an extraction process that simultaneously removes or extracts cesium and strontium from an acidic solution. Such a development would improve capacity of long-term storage facilities and reduce the need to create new storage facilities. In order to be useful in large-scale processing applications, the solvent used in such an extraction process would desirably be highly selective, cost effective, produce reduced waste volume, and be relatively nonhazardous.

BRIEF SUMMARY OF THE INVENTION

The present invention comprises a mixed extractant solvent that includes calix[4]arene-bis-(tert-octylbenzo)-crown-6 ("BOBCalixC6"), 4',4',(5')-di-(t-butyldicyclo-hexano)-18-crown-6 ("DtBu18C6"), and at least one modifier dissolved in a diluent. The BOBCalixC6 may be present in the mixed extractant solvent from approximately 0.0025M to approximately 0.025M. The DtBu18C6 may be present in the mixed extractant solvent from approximately 0.01M to approximately 0.5M, such as from approximately 0.086 M to approximately 0.108 M. At least one modifier may be 1-(2,2,3,3-tetrafluoropropoxy)-3-(4-sec-butylphenoxy)-2-propanol ("Cs-7SB"), which may be present in the mixed extractant solvent from approximately 0.2M to approximately 1.0M. The diluent may be an isoparaffinic hydrocarbon. The mixed extractant solvent may further include trioctylamine, tri-n-butyl phosphate, or mixtures thereof. In one embodiment, the mixed extractant solvent may include approximately 0.15M DtBu18C6, approximately 0.007M BOBCalixC6, and approximately 0.75M Cs-7SB modifier dissolved in an isoparaffinic hydrocarbon.

The present invention also comprises an extraction system that includes an organic phase and an aqueous phase. The organic phase includes the mixed extractant solvent as referenced above. The aqueous phase includes an acidic solution, such as a dissolved spent nuclear fuel. The acidic solution may have from approximately 0.01M to approximately 3M nitric acid. The acidic solution may also include cesium and strontium.

The present invention also comprises a method of separating cesium and strontium from an acidic solution. The method includes providing an acidic solution that has cesium and strontium. The acidic solution is contacted with a mixed extractant solvent as referenced above. The acidic solution may include from approximately 0.01M to approximately 3M nitric acid. After contacting the acidic solution with the mixed extractant solvent, a first organic phase and a first aqueous phase may be formed. The cesium and strontium may be extracted into the first organic phase. The first organic phase and the first aqueous phase may be separated, removing the cesium and strontium from the acidic solution. The extraction of the cesium and strontium may be conducted at a temperature ranging from approximately 1° C. to approximately 40° C., such as from approximately 10° C. to approximately 15° C.

The cesium, strontium, and mixed extractant solvent may be recovered by contacting the first organic phase with a second aqueous phase. The cesium and strontium may be extracted into the second aqueous phase, which is separated from the first organic phase. The cesium and strontium may be recovered at a temperature ranging from approximately 10° C. to approximately 60° C., such as from approximately 20° C. to approximately 40° C.

The present invention also comprises a method of extracting strontium from an acidic solution. The acidic solution includes strontium and is contacted with a solvent that includes DtBu18C6, Cs-7SB, and an isoparaffinic hydrocarbon.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

Figure 1:
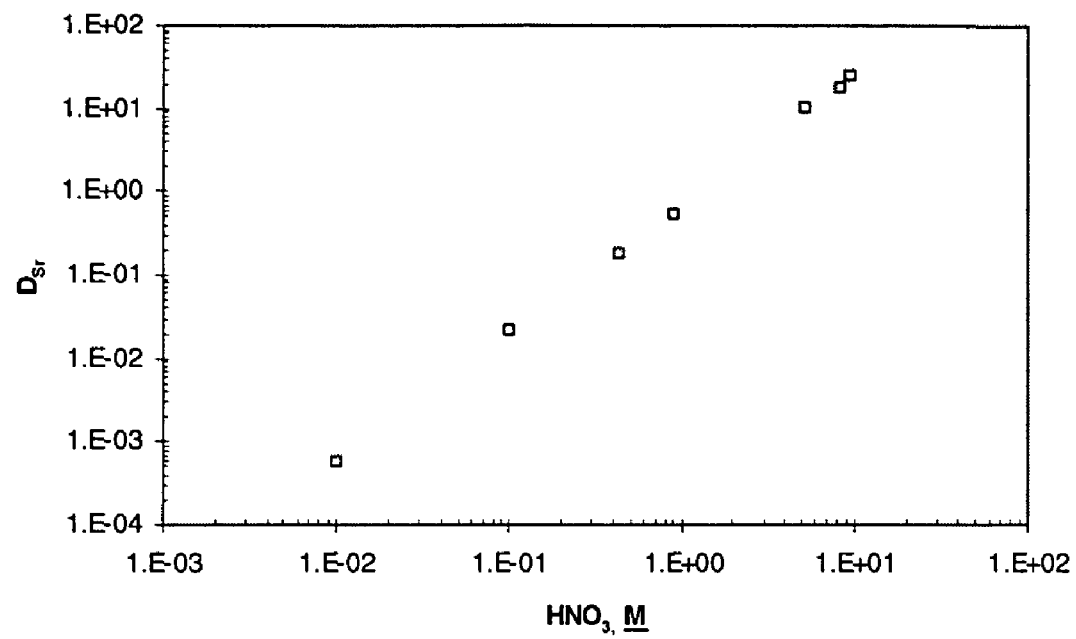
FIG. 1 shows nitric acid dependencies for SREX at approximately 24° C.

A mixed extractant solvent for extracting cesium and strontium from an acidic solution is disclosed. The mixed extractant solvent simultaneously or concurrently extracts cesium and strontium from the acidic solution. The cesium and strontium are collectively referred to herein as "radionuclides." The mixed extractant solvent includes a crown ether compound, a calixarene compound, and at least one modifier dissolved in a diluent. The crown ether compound and the calixarene compound are collectively referred to herein as "extractants." The mixed extractant solvent may form a first organic phase of a first extraction system that also includes a first aqueous phase. The extractants may be sufficiently soluble in the first organic phase so that a high concentration of the extractants is achieved. The concentration of the extractants in the first organic phase may be sufficiently high to effectively remove the radionuclides from the acidic solution. The extractants may also be relatively insoluble in the first aqueous phase.

The crown ether used in the mixed extractant solvent may be 4',4',(5')-di-(t-butyldicyclo-hexano)-18-crown-6 ("DtBu18C6"). DtBu18C6 is available from Eichrom Industries Inc. (Darien, Ill.) and has a molecular weight of 484.72 g/mol. The crown ether may be present in the mixed extractant solvent from approximately 0.001M to approximately 0.5M. In one embodiment, the crown ether is present from approximately 0.086 M to approximately 0.108 M. DtBu18C6 has the following structure:

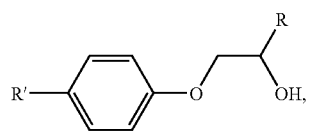

The calixarene used in the mixed extractant solvent may be calix[4]arene-bis-(tert-octylbenzo)-crown-6 ("BOBCalixC6"). BOBCalixC6 is available from IBC Advanced Technologies, Inc. (American Fork, Utah) and has a molecular weight of 1149.52 g/mol. The calixarene may be present in the mixed extractant solvent from approximately 0.0025M to approximately 0.025M. BOBCalixC6 has the following structure:

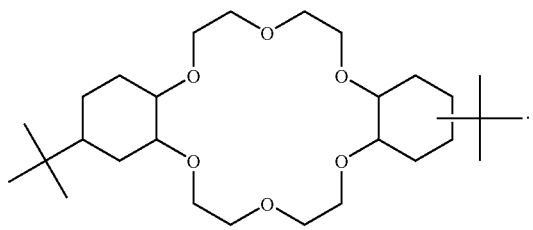

The modifier may be an alcohol modifier, trioctylamine ("TOA"), tri-n-butyl phosphate ("TBP"), or mixtures thereof. The modifier may increase the extractants' ability to extract the radionuclides and may enable a lower concentration of the extractants to be used in the mixed extractant solvent. Since many crown ether and calixarene compounds have limited solubility in diluents, the modifier may keep the extractants dissolved in the diluent. The modifier may also prevent the formation of a third phase during the extraction. In addition, the modifier may improve stripping efficiency of the radionuclides, enabling the cesium and strontium to be effectively removed or stripped from the mixed extractant solvent. The alcohol modifier may have a general structure of

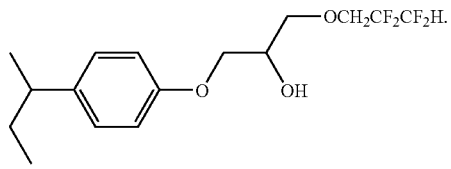

where R and R' are as described in Leonard et al., Sep. Sci. and Technol., 36(5-6):743-766 (2001), Leonard et al., Solvent Extr. And Ion Exch., 21(4):505-526 (2003), and Duchemin et al., Solvent Extr. And Ion Exch., 19(6):1037-1058 (2001). For instance, the alcohol modifier may be 1-(2,2,3,3-tetrafluoropropoxy)-3-(4-sec-butylphenoxy)-2-propanol ("Cs-7SB"), which has the following structure:

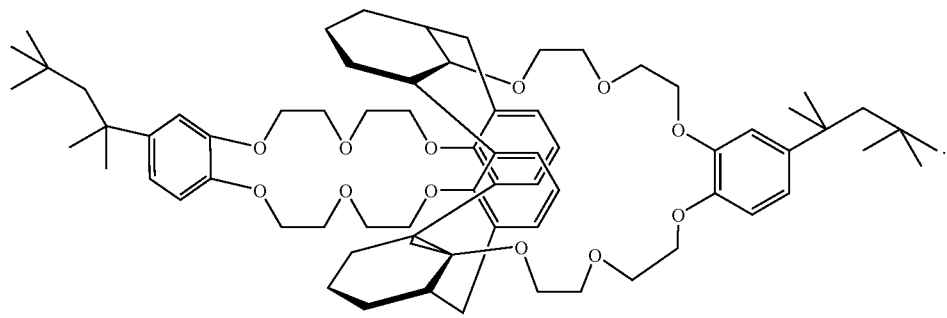

The Cs-7SB may be present in the mixed extractant solvent from approximately 0.2M to approximately 1.0M.

The diluent may be an inert diluent, such as a straight chain hydrocarbon diluent. For instance, the diluent may be an isoparaffinic hydrocarbon diluent, such as Isopar® L or Isopar® M. Isopar® L includes a mixture of $C_{10}$-$C_{12}$ isoparaffinic hydrocarbons and is available from Exxon Chemical Co. (Houston, Tex.). Isopar® M includes a mixture of $C_{12}$-$C_{15}$ isoparaffinic hydrocarbons and is available from Exxon Chemical Co. (Houston, Tex).

The mixed extractant solvent may include other combinations of cesium extractants and strontium extractants besides DtBu18C6 and BOBCalixC6. For instance, combinations of other crown ethers and calixarenes that are capable of concurrently extracting cesium and strontium may be used. In general, crown ethers having a dicyclohexano structure may provide selectivity for strontium and those having a dibenzo structure may provide selectivity for cesium. Additional crown ethers are known in the art and include, but are not limited to, cis-dicyclohexano-18-crown-6 ("DCH18C6"), dimethyl derivatives thereof, and di-t-butyl derivatives thereof. Additional calixarenes are known in the art and may be used in the mixed extractant solvent, such as derivatives of calix[4]arene-crown-6 ether including, but not limited to, mono- and bis-crown-6-derivatives of 1,3 calix[4]arenes. The calixarenes may be in cone, partial cone, 1,2 alternate, or 1,3 alternate conformations. The mixed extractant solvent may also include other alcohol modifiers, such as derivatives of 2-(4-tert-octylphenoxy)-1-ethanol or derivatives of 1-(4-tert-octylphenoxy)-3-(1,1,2,2-tetrafluoroethoxy)-2-propanol. The alcohol modifiers may have fluorine containing substituents on the alcohol carbon. In addition, other diluents, such as 1-octanol, may be used.

In one embodiment, the mixed extractant solvent includes 0.15M DtBu18C6, 0.007M BOBCalixC6, and 0.75M Cs-7SB modifier in Isopar® L. The mixed extractant solvent may extract cesium and strontium from a 1M nitric acid solution with a $D_{Sr}$ of approximately 10 and a $D_{Cs}$ of approximately 8 at ambient temperature. In contrast, the SREX solvent used alone had a substantially lower $D_{Sr}$ of 0.7 while the CSSX solvent used alone had a similar $D_{Cs}$ of 8.0. The mixed extractant solvent may provide improved cesium and strontium extraction compared to a 1:1 volume ratio of the SREX and CSSX solvents. When the SREX and CSSX solvents were mixed in a 1:1 volume ratio, the $D_{Sr}$ decreased to 1.5 and the $D_{Cs}$ dropped significantly to 0.64. These results indicate that the mixed extractant solvent may provide substantially improved extraction of the cesium and strontium compared to using the SREX and CSSX solvents alone or in a 1:1 volume ratio.

The distribution of cesium and strontium between the organic phase and the aqueous phase may be determined by conventional techniques. The distribution ratio for strontium ("$D_{Sr}$") was calculated as the ratio of organic phase activity to the aqueous phase activity at equilibrium. High values for the $D_{Sr}$ indicate that the strontium is present in the organic phase while low values for the $D_{Sr}$ indicate that the strontium is present the aqueous phase. Similarly, the distribution ratio for cesium ("$D_{Cs}$") was calculated as the ratio of organic phase activity to the aqueous phase activity at equilibrium. High values for the $D_{Cs}$ indicate that the cesium is present in the organic phase while low values for the $D_{Cs}$ indicate that the cesium is present the aqueous phase.

The mixed extractant solvent may be prepared by combining the crown ether, the calixarene, and the modifier with the diluent to form a mixture. Initially, a portion of a final volume of the diluent may be added to the extractants and the modifier to lower the viscosity of the mixture. The mixture may be stirred overnight and the remainder of the diluent may then be added.

The mixed extractant solvent may be used to simultaneously extract cesium and strontium from the acidic solution, such as from an acidic nuclear waste solution. The acidic solution may include from approximately 0.001M to approximately 3M nitric acid ("$HNO_3$"). Since these nitric acid levels are similar to the levels typically present in dissolved spent nuclear fuel, the mixed extractant solvent may be used to effectively remove cesium and strontium from dissolved spent nuclear fuel solutions. For instance, the mixed extractant solvent may remove cesium and strontium from an acidic solution having from approximately 0.5M to approximately 3M nitric acid. In one embodiment, the mixed extractant solvent simultaneously extracts cesium and strontium from a 1M nitric acid solution with a $D_{Sr}$ of approximately 10 and a $D_{Cs}$ of approximately 8 at ambient temperature. The mixed extractant solvent may remove substantially all of the cesium and strontium from the acidic solution after four sequential extractions.

By removing the radionuclides, the mixed extractant solvent may be used to lower the radioactive waste volume and heat load of the acidic solution. In addition, the radionuclides and the mixed extractant solvent may be recovered and the mixed extractant solvent may be recycled. The extraction method of the present invention may also produce less secondary waste than in conventional techniques. Furthermore, since the cesium and strontium may be removed simultaneously, the extraction system of the present invention may be advantageous over conventional techniques, which require multiple, separate steps to remove the cesium and strontium.

As discussed in detail below, the mixed extractant solvent may provide improved levels of extraction of cesium and strontium compared to the level of extraction achieved when the SREX and CSSX solvents are combined. In other words, the mixed extractant solvent provides synergistic results for the removal of the strontium while coextracting the cesium.

The mixed extractant solvent may be used to selectively extract cesium and strontium over additional components in the acidic solution. In addition to cesium and strontium, the acidic solution may include other ions or radioactive elements. Typical components of dissolved spent nuclear fuel solutions are shown in Table 1. Simulants having various combinations of the components shown in Table 1 may be prepared to test the mixed extractant solvent.

TABLE 1

Typical major components of dissolved, high burn-up spent nuclear fuel solutions.

| Component | Amount | Component | Amount |
|---|---|---|---|
| Acid (M) | 0.8 | Pr g/l | 0.63 |
| Tc g/l | 0.41 | Nd g/l | 2.34 |
| Ba g/l | 1.59 | Zr g/l | 0.42 |
| Ce g/l | 1.37 | Sm g/l | 0.47 |
| Cs g/l | 1.43 | Np g/l | 0.43 |
| La g/l | 0.70 | Pu g/l | 4.76 |
| Pd g/l | 1.03 | Am g/l | 0.62 |
| Mo g/l | 2.09 | Sn g/l | 1.39 |
| Sr g/l | 0.44 | Rb g/l | 0.20 |
| Pd g/l | 1.03 | | |
| Rb g/l | 0.20 | | |

The cesium and strontium may be removed or forward extracted from the acidic solution by mixing the acidic solution with the mixed extractant solvent. As used herein the terms "forward extract," "forward extracted," or "forward extraction" refer to removing or extracting the cesium and strontium from the first aqueous phase of the first extraction system. As such, the first extraction system may include the acidic solution (the first aqueous phase) and the mixed extractant solvent (the first organic phase). The first organic phase and the first aqueous phase may be agitated with one another to extract the cesium and strontium into the first organic phase. The distribution of the cesium and strontium between the first organic phase and the first aqueous phase may heavily favor the first organic phase. The acidic solution may be mixed with the mixed extractant solvent for an amount of time sufficient to form complexes between the cesium and strontium and the extractants. For instance, complexes may be formed between the cesium and the calixarene and between the strontium and the crown ether. After mixing the mixed extractant solvent and the acidic solution for an amount of time sufficient for the complexes to form, two phases may be formed in the first extraction system: the first organic phase and the first aqueous phase. The cesium and strontium may be present in the first organic phase while the first aqueous phase may be substantially depleted of cesium and strontium. The first aqueous phase may include any other ions or radioactive elements that were present in the acidic solution. The first organic phase and the first aqueous phase may then be separated, effectively removing the cesium and strontium from the acidic solution.

Once separated, the first organic phase and the first aqueous phase may be further processed. For instance, the first aqueous phase may be extracted multiple times with the mixed extractant solvent to remove substantially all of the cesium and strontium. The first aqueous phase may also be further extracted to remove the additional ions or radioactive elements that may have been present in the acidic solution, such as by using conventional techniques. The radionuclides may be stripped or back extracted from the first organic phase to recover the cesium, strontium, and the mixed extractant solvent. As used herein, the terms "back extract," "back extracted," or "back extraction" refer to removing or extracting the cesium and strontium from the mixed extractant solvent. During recovery and recycling conditions, the distribution of the cesium and strontium between the first organic phase and a second aqueous phase may heavily favor the second aqueous phase. The cesium and strontium may be removed from the first organic phase by contacting the first organic phase with the second aqueous phase. The second aqueous phase and the first organic phase may form a second extraction system. The second aqueous phase may be a dilute acidic solution, such as a nitric acid solution having from approximately 0.001M $HNO_3$ to approximately 0.5M $HNO_3$. In addition, water or other dilute mineral acids may be used as the second aqueous phase.

The first organic phase may be mixed with the second aqueous phase for an amount of time sufficient for the cesium and strontium ions to dissociate from the complexes of the cesium and strontium with the extractants. Once dissociated, the cesium and strontium may be extracted into the second aqueous phase. The second aqueous phase, having substantially all of the cesium and strontium, may be separated from the first organic phase, which is substantially depleted of cesium and strontium. The radionuclides in the second aqueous phase may then be used or stored. For instance, the cesium and strontium may be solidified for storage. Alternatively, the recovered cesium and strontium may be used as gamma sources, beta sources, or heat sources. The recovered mixed extractant solvent may be reused or recycled into subsequent extractions.

The acidic solution may also be processed to remove the additional ions and radioactive elements before the cesium and strontium are removed by the method of the present invention. The additional ions and radioactive elements may be removed by exposure to conventional extraction processes.

The extraction and recovery of the cesium and strontium may be performed at a temperature ranging from approximately 1° C. to approximately 40° C. To provide optimal extraction of the cesium and strontium, the forward extraction may be conducted at low temperatures within this range, such as at a temperature ranging from approximately 10° C. to approximately 15° C. However, the forward extraction may also be conducted at ambient temperature, such as from approximately 20° C. to approximately 25° C. The backward extraction of the cesium and strontium may be conducted at a wider range of temperatures, such as from approximately 10° C. to approximately 60° C. For instance, the backward extraction may be performed at a temperature ranging from approximately 20° C. to approximately 40° C.

A solvent mixture having the DtBu18C6 extractant, the Cs-7sB modifier, and a diluent may also be used to extract strontium from an acidic solution. The solvent mixture may improve the forward distribution of strontium. For instance, the $D_{Sr}$ from a 1M nitric acid solution may be increased from approximately 0.7 using the SREX solvent to a range of approximately 5 to approximately 7 using the solvent mixture having DtBu18C6, Cs-7sB, and the diluent.

The following examples serve to explain embodiments of the present invention in more detail. These examples are not to be construed as being exhaustive or exclusive as to the scope of this invention.

EXAMPLES

All solvents used in the extraction process were reagent grade and were used as received. Deionized water was used to prepare all aqueous acid solutions. The nitric acid was reagent grade and was obtained from Sigma-Aldrich Chemical Co. (St. Louis, Mo.). Isopar® L isoparaffinic diluent was obtained from Exxon Chemical Co. (Houston, Tex.). The $^{85}$Sr and $^{137}$Cs radiotracers used to spike the simulants were obtained as $^{85}$SrCl$_2$ in 1M HCl and $^{137}$CsCl in 1M HCL from Isotope Products (Burbank, Calif.). Both radiotracers were converted to the nitrate form prior to use. The DtBu18C6 was purchased from Eichrom Industries Inc. (Darien, Ill.). The BOBCalixC6 and the Cs-7SB modifier were obtained from Oak Ridge National Laboratory and were used as received.

Comparative Example 1

Preparation of the SREX Solvent and the CSSX Solvent

The SREX solvent was prepared using a mixture of 0.1 5M DtBu18C6, 1.2M TBP, and Isopar® L as described in Horowitz et al., Solvent Extr. And Ion Exch., 9(1):1-25 (1991). The mixture was stirred for approximately 1 hour, until the DtBu18C6 and TBP went into solution.

The CSSX solvent included 0.007M BOBCalixC6, 0.750M Cs-7SB modifier, 0.003M TOA, and Isopar® L as described in Bonnesen et al., "Extraction of Cesium from Savannah River Tank Waste Using a Calixarene Crown Ether Extractant," Report ORNL/TM-13704, Oak Ridge National Laboratory: Oak Ridge, Tenn. (December 1998) and was received already prepared.

Comparative Example 2

Nitric Acid Dependencies of the SREX Solvent and the CSSX Solvent

The $^{85}$Sr and $^{137}$Cs radiotracers were diluted to 7.3 μCi/ml and heated to incipient dryness. Concentrated $HNO_3$ was then added to convert the radiotracers to the nitrate salts.

After three such cycles, 10 ml of varying concentrations of $HNO_3$ (from 0.01M to 10M) were added to the radiotracers to redissolve the salts in preparation for the extraction studies. Carrier free $^{85}Sr$ in varying concentrations of $HNO_3$ was mixed in equal proportions with the SREX solvent and shaken for 1 minute. The sample was then centrifuged for 1 minute and the resulting organic and aqueous phases sampled for analysis. Aliquots of the organic and aqueous phases were γ-ray counted using a Princeton Gamma-Tech ("PGT") detector having a bias of $^+3500V$. As shown in FIG. 1, the SREX solvent had a $D_{Sr}$ of 0.70 in 1M $HNO_3$ at ambient temperature. The mean of this data (N=3) has an experimental uncertainty of ±5% in the distribution ratio and is consistent with previous work. In all additional testing, carriers were used for both the strontium and cesium except when stated otherwise. The carrier concentrations included 0.001M $Sr(NO_3)_2$ and 0.0001M $CsNO_3$.

During the initial nitric acid dependency testing, it was discovered that the 8M and 10M $HNO_3$ samples exhibited third phase formation when mixed with the SREX solvent. Therefore, testing was performed to determine the acidity at which a third phase started to occur. Concentrations of 1M, 2M, 3M, 4M, and 5M $HNO_3$ were tested and it was observed that the third phase formed in extraction contacts having greater than or equal to 3M $HNO_3$.

Figure 2:
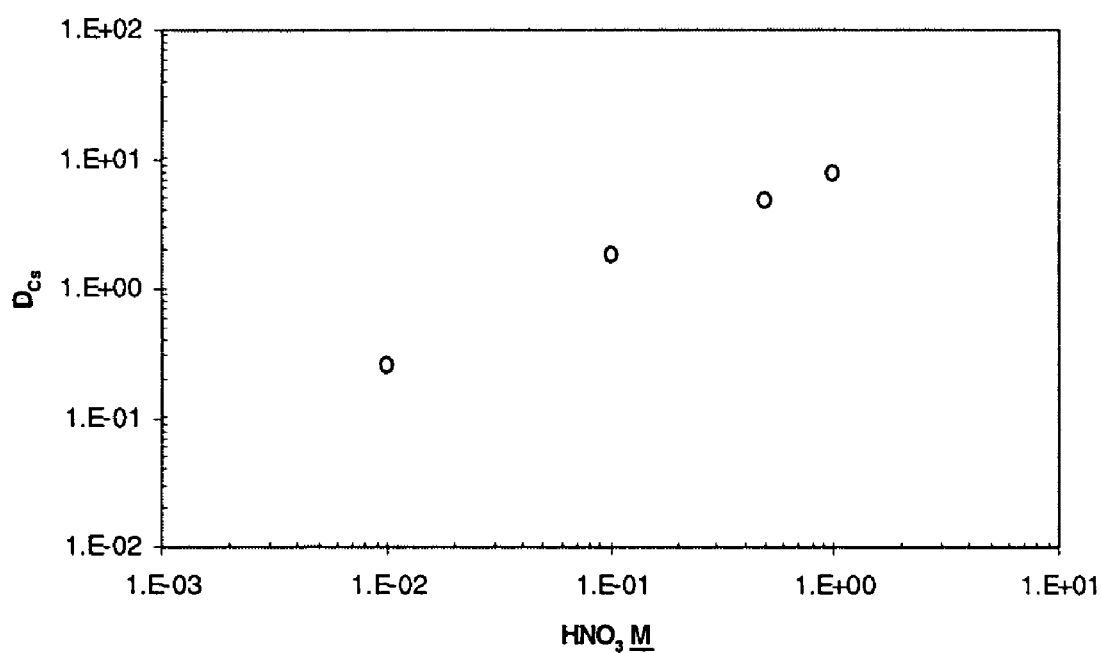
FIG. 2 show nitric acid dependencies for CSSX at approximately 24° C.

A $D_{Cs}$ nitric acid dependency test was also performed for the CSSX solvent, the results of which are shown in FIG. 2. The CSSX solvent had a $D_{Cs}$ of 8.0 in 1M $HNO_3$ at ambient temperature. The $D_{Cs}$ nitric acid dependency is linear and at unity with respect to the distribution ratio when plotted on a log-log basis. The slopes of the nitric acid dependency for both cesium and strontium showed that $Sr^{2+}$ was charge balanced by $2NO_3^-$ and $Cs^+$ was balanced by one $NO_3^-$, which concurred with previous work.

It was also determined that no coextraction of the cesium into the SREX solvent and no extraction of the strontium into the CSSX solvent occurred when the SREX solvent and the CSSX solvent were evaluated separately.

Comparative Example 3

A 1:1 Volume Ratio of the SREX and CSSX Solvents Does Not Effectively Remove Cesium and Strontium When the SREX and CSSX solvents were mixed in a 1:1 volume ratio, the $D_{Sr}$ increased slightly to 1.5 but the $D_{Cs}$ dropped significantly to 0.64. In contrast, the SREX solvent when used alone had a $D_{Sr}$ of 0.70 and the CSSX solvent when used alone had a $D_{Cs}$ of 8.0, as described in Comparative Example 2. Since the $D_{Cs}$ dropped significantly, these results indicate that simply combining the SREX and the CSSX solvents in a 1:1 volume ratio did not effectively coextract both cesium and strontium.

Example 1

Coextraction of Cesium and Strontium

Figure 3:
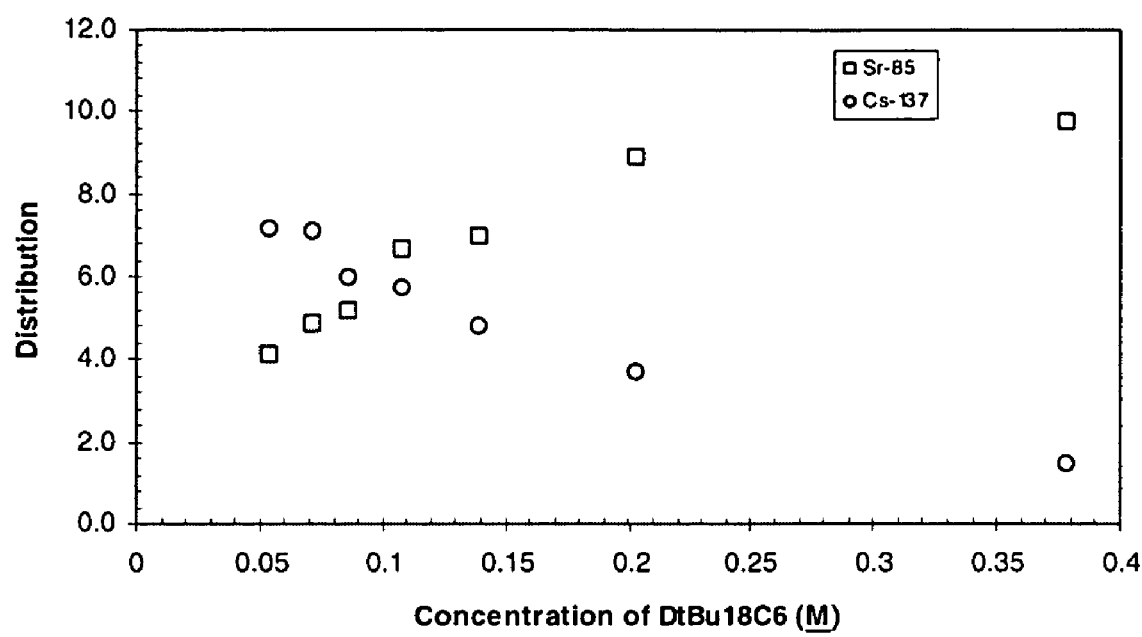
FIG. 3 shows the $D_{Cs}$, and $D_{Sr}$ in 1M $HNO_3$ with varied concentrations of DtBu18C6 in the CSSX solvent at 24° C.

Neat DtBu18C6, the extractant used in the SREX solvent, was added in varying concentrations to the CSSX solvent. Unexpectedly, an increased forward distribution for strontium was observed. In fact, the $D_{Sr}$ increased dramatically to 9.8 while the $D_{Cs}$ remained approximately the same ($D_{Cs}$=8.0) as obtained with the CSSX solvent alone. To attain high distribution coefficients for both cesium and strontium, simultaneously, an optimum mixture for the DtBu18C6 and the BOBCalixC6 was found. A plot of the cesium and strontium distribution coefficients as a function of the ratios of DtBu18C6 to 0.007M BOBCalixC6 is shown in FIG. 3. Distribution coefficients for the cesium and strontium diverged at high and low concentrations of the DtBu18C6. However, favorable forward extraction of the cesium and strontium was obtained at DtBu18C6 concentrations ranging from 0.053M to 0.378M. The distribution coefficients were almost equal at DtBu18C6 concentrations ranging from 0.086 M to 0.108 M. At these DtBu18C6 concentrations, the mixed extractant solvent extracted approximately six times more cesium and strontium in a single contact than remained in the nitric acid solution. This level of extraction provides a cesium and strontium removal of 99.9% in four sequential contacts with the mixed extractant solvent.

In order to determine which component or components of the mixed extractant solvent were causing the synergy, the two main components used in the CSSX solvent (BOBCalixC6 and Cs-7SB modifier) and the DtBu18C6 from the SREX solvent were procured. Different concentrations of these components in various combinations were mixed and tests were conducted on the different variations.

Since it was determined that 1M $HNO_3$ gave favorable combined forward distributions for cesium and strontium, 1M $HNO_3$ was used as the aqueous phase acidity unless otherwise specified. All solvents used were preequilibrated with 1M $HNO_3$. The first combination of tested solvents included 0.15M DtBu18C6 and 0.75M Cs-7SB modifier in Isopar®L. In this solvent extraction system, the $D_{Sr}$ was 6.36 and the $D_{Cs}$ was 0.046 at 24° C. Since the $D_{Cs}$ value was low, these results indicated that no cesium extraction occurred with the DtBu18C6 but that enhanced strontium extraction occurred due to the Cs-7SB modifier.

The second combination of solvents included 0.15M DtBu18C6 and 0.007M BOBCalixC6, which were the same concentrations used in the CSSX and SREX solvents, while the Cs-7SB modifier concentration was varied. The results of these extractions are shown below in Table 2.

TABLE 2

Cesium and Strontium Distribution Ratios as a Function of Varying Cs-7SB Concentration.

| Concentration Of Cs-7SB (M) | $D_{Cs}$ | $D_{Sr}$ |
|---|---|---|
| 0.01 | 7.7E-3 | 0.01 |
| 0.10 | 0.17 | 0.23 |
| 0.75 | 3.51 | 4.04 |
| 0.80 | 3.80 | 1.92 |

The data in Table 2 indicated that although the $D_{Cs}$ increased with increasing Cs-7SB concentration, the $D_{Sr}$ peaked at or near a concentration of 0.75M of the Cs-7SB. Thus, for the remainder of the extraction tests, the concentration of the Cs-7SB remained at 0.75M.

An extraction of strontium with DtBu18C6, TBP, and TOA in Isopar® L was performed as well as an extraction of DtBu18C6 and TOA in Isopar® L. The $D_{Sr}$ was 0.56 and 0.01 at 20° C., respectively. These results, coupled with the results from the mixture of SREX and CSSX described earlier, indicated that the TBP could be removed from the mixed extractant solvent. The results also indicated that the TOA was optional under the experimental extraction conditions. The distribution ratios showed that when the TOA was added to the SREX solvent, it extracted strontium no better than in the SREX solvent alone. A study also determined that using a solvent including only the Cs-7SB modifier in Isopar® L exhibited no extraction of cesium and strontium from 1 M nitric acid solutions.

While the TBP of the SREX solvent was originally used in the mixed extractant solvent to enhance the solubility of the strontium in the organic phase, the TBP was found to provide no additional benefit to the coextraction of the cesium and strontium with the mixed extractant solvent. Rather, it was determined that the TBP possibly hindered forward strontium extraction. The TOA, which was added to the CSSX process to aid in cesium stripping by preventing undesired complexation of cesium with organic impurities dissolved during continuous processing, did not interfere with strontium forward distributions in the tests using neat DtBu18C6 added to the CSSX solvent. However, TOA was not used in the mixed extractant solvent so that the testing could be performed under controlled conditions. Therefore, when this extraction method is employed on an industrial scale, it may be necessary to add TOA to the mixed extractant solvent.

Example 2

Extraction of Strontium with Cs-7SB

Tests conducted to determine the component responsible for the elevated strontium distributions indicated that the Cs-7SB modifier provided the increased strontium distribution. The forward distribution of strontium from 1M $HNO_3$ solutions was increased from 0.7 at ambient temperature using SREX (DtBu18C6 and TBP in Isopar®L) to between 5 and 7 using a mixture of DtBu18C6, the Cs-7SB modifier, and the Isopar L ® diluent. As such, the Cs-7SB modifier provided a significant improvement over the SREX extractant for processes where selective strontium removal from acidic solutions is desired. While the positive effect of fluorinated modifiers is known for the extraction of cesium using crown ethers or calixarenes, these modifiers have not been used instead of TBP in the SREX solvent for enhancing strontium extraction.

Example 3

Temperature Dependence of the Cesium/Strontium Extraction

Figure 4:
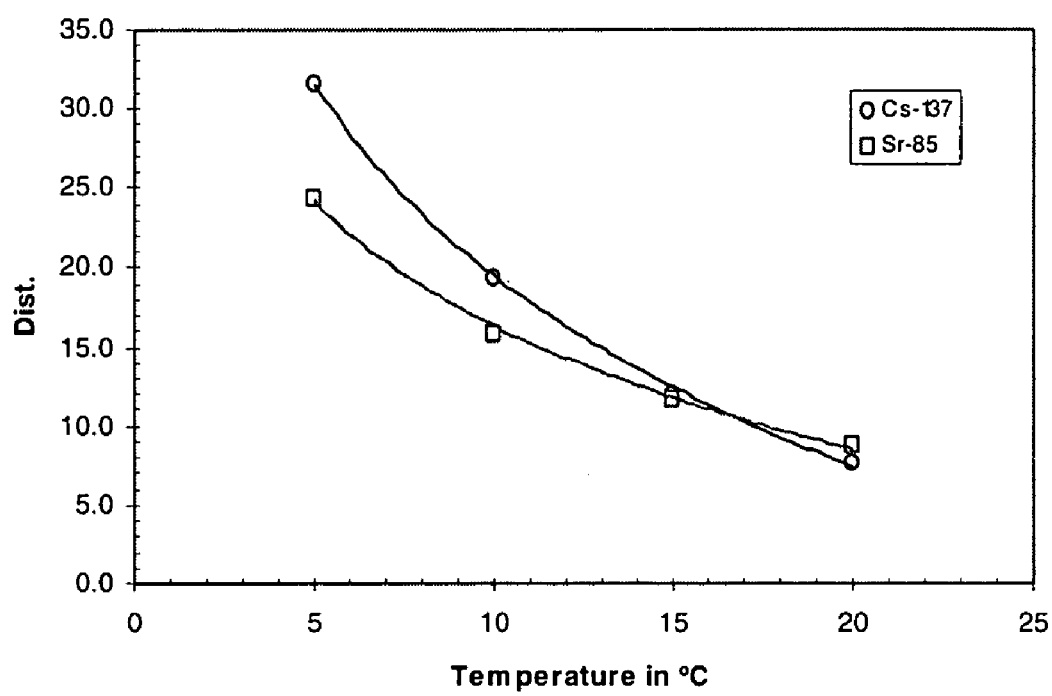
FIG. 4 shows the temperature dependence of an embodiment of a mixed extractant solvent that includes DtBu18C6, BOBCalixC6, and Cs-7SB.

When a second round of testing was performed to reproduce the data presented in FIG. 3, the ambient temperature had dropped from 24° C. to 20° C. At 20° C., the $D_{Sr}$ from a 1M $HNO_3$ solution was found to be higher, with a $D_{Sr}$ of 11.3 instead of a $D_{Sr}$ of 9.8 at 24° C. (as described in Example 1). Since high distribution ratios are desired, the increase in $D_{Sr}$ with decreasing temperature was of interest since it has been noted in the literature that the forward distributions of cesium in BOBCalixC6 are similarly temperature dependent. To further elucidate the effect of temperature, temperature dependence tests were performed on the SREX solvent, the CSSX solvent, and the mixed extractant solvent. Tests performed at 10° C. showed that the $D_{Sr}$ for the SREX solvent was 2.2 and the $D_{Cs}$ for the CSSX solvent was 46.0. In contrast, the distribution ratios at 24° C. were lower, with a $D_{Sr}$ of 0.70 and a $D_{Cs}$ of 8.0. The temperature dependence tests on the mixed extractant solvent showed that very favorable distributions were achieved at 10° C., as shown in FIG. 4. The $D_{Sr}$ and $D_{Cs}$ with the mixed extractant solvent were approximately 16 and approximately 20, respectively. The non-linear shape seen in FIG. 4 is due to an enthalpy effect, which indicates that this is an exothermic and, thus, favorable reaction. The lower the temperature, the more excess energy is removed from the system, driving the equilibrium and raising the forward distributions of the cesium and strontium.

Example 4

Figure 5:
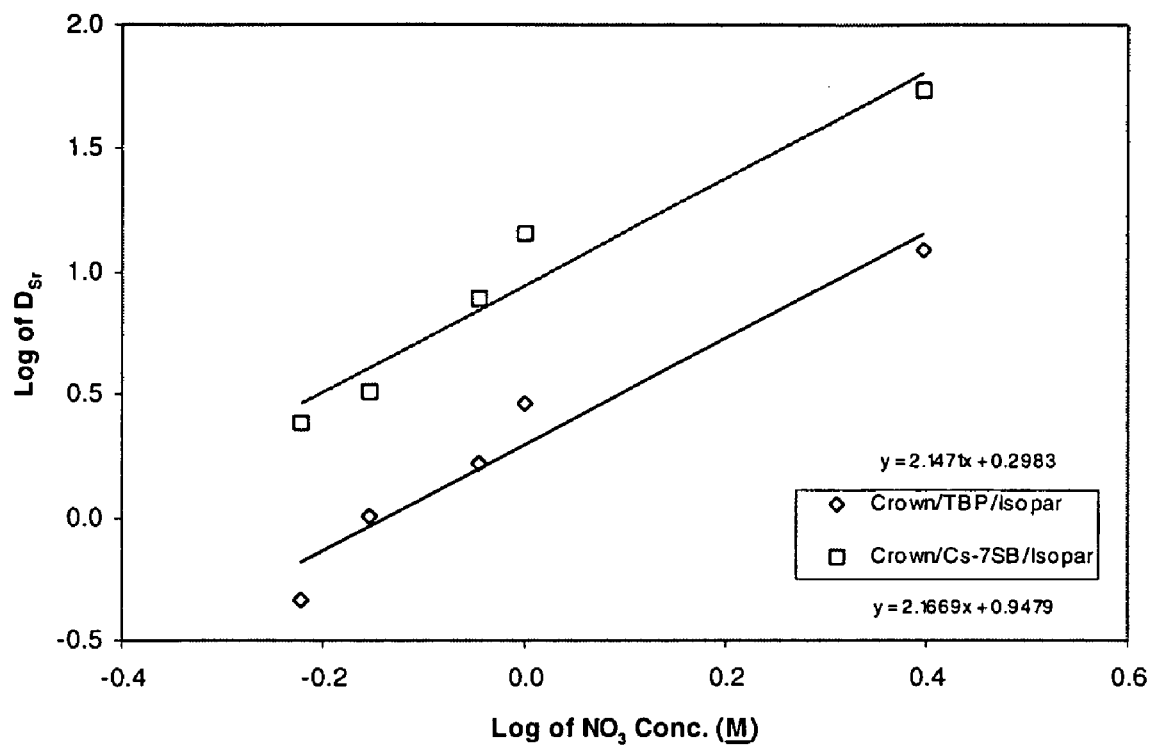
FIG. 5 shows the nitrate dependence of the SREX solvent (0.15M DtBu18C6 and 1.2M TBP in the Isopar® L diluent) and of the solvent mixture (0.15M DtBu18C6 and 0.75M Cs-7SB modifier in the Isopar® L diluent)

Nitrate Dependency Tests on Strontium Distributions from the SREX Solvent and the Solvent Mixture Nitrate dependency tests were performed on the SREX solvent (0.15M DtBu18C6 and 1.2M TBP in the Isopar L diluent) and on the solvent mixture (0.15M DtBu18C6 and 0.75M Cs-7SB modifier in the Isopar L diluent) using $Al(NO_3)_3$ in an effort to compare and determine the effect of nitrate ions on the forward distribution of strontium. The nitrate concentrations were varied by adding $Al(NO_3)_3$ to 0.5M $HNO_3$ to yield 0.6M, 0.7M, 0.9M, 1.0M, and 2.5M total $NO_3$. The results from these tests are shown in FIG. 5 and indicate an increase in strontium distribution with increasing nitrate concentrations, giving a slope of approximately 2 for both solvents. These slopes indicate a charge balance of the $Sr^{2+}$ with $2NO_3^-$ ions, which concurs with previous work. In addition, the data in FIG. 5 shows that the solvent mixture (DtBu18C6 and Cs-7SB modifier in Isopar® L) gives a factor of 4 higher distribution than the SREX solvent. Concentrations of 2.5M $NO_3$ yielded a forward distribution for the solvent mixture (DtBu18C6 and Cs-7SB modifier in Isopar L) of $D_{Sr}=46$, while the distribution for the SREX solvent was $D_{Sr}=12$ at ambient temperature.

Example 5

Recovery of Cesium and Strontium using the Mixed Extractant Solvent

To develop a complete extraction process, the ability to sequentially extract and back extract the cesium and strontium and to recover and reuse the mixed extractant solvent was studied. A combination of solvents that included 0.15M DtBu18C6, 0.007M BOBCalixC6, and 0.75M Cs-7SB modifier in Isopar®L was prepared by adding neat DtBu18C6, BOBCalixC6, and the Cs-7SB modifier to a mixing vessel. Approximately 10% of the required final Isopar®L volume was added to lower the viscosity and the mixture was left to stir overnight. The remainder of the Isopar®L was then added as a diluent the next morning to form the mixed extractant solvent.

Sequential extractions of fresh aliquots of the mixed extractant solvent with the same aliquot of radioactive traced carrier solution gave the following forward distribution ratios for cesium and strontium:

TABLE 3

Forward Distribution Ratios for Cesium and Strontium.

| Contact # | $D_{Cs}$ | $D_{Sr}$ |
|---|---|---|
| 1 | 8.1 | 9.5 |
| 2 | 11.1 | 11.6 |

TABLE 3-continued

Forward Distribution Ratios for Cesium and Strontium.

| Contact # | $D_{Cs}$ | $D_{Sr}$ |
|---|---|---|
| 3 | 7.6 | 8.4 |
| 4 | * | * |

* The level of cesium and strontium remaining in the acidic solution were below detection limits in extraction contact #4.

Efficient stripping of most of the cesium and strontium from the organic phase was demonstrated in two stages by repeatedly contacting equal volumes of the organic phase with 0.01M $HNO_3$. The results of two typical back extractions (strips) at 20° C. are shown in Table 4.

TABLE 4

Backward Distribution Ratios for Cesium and Strontium.

| | $D_{Cs}$ | $D_{Sr}$ |
|---|---|---|
| Strip #1 | 0.33 | 0.02 |
| Strip #2 | 0.17 | 0 |

Example 6

Nitric Acid Dependency of the Mixed Extractant Solvent

Figure 6:
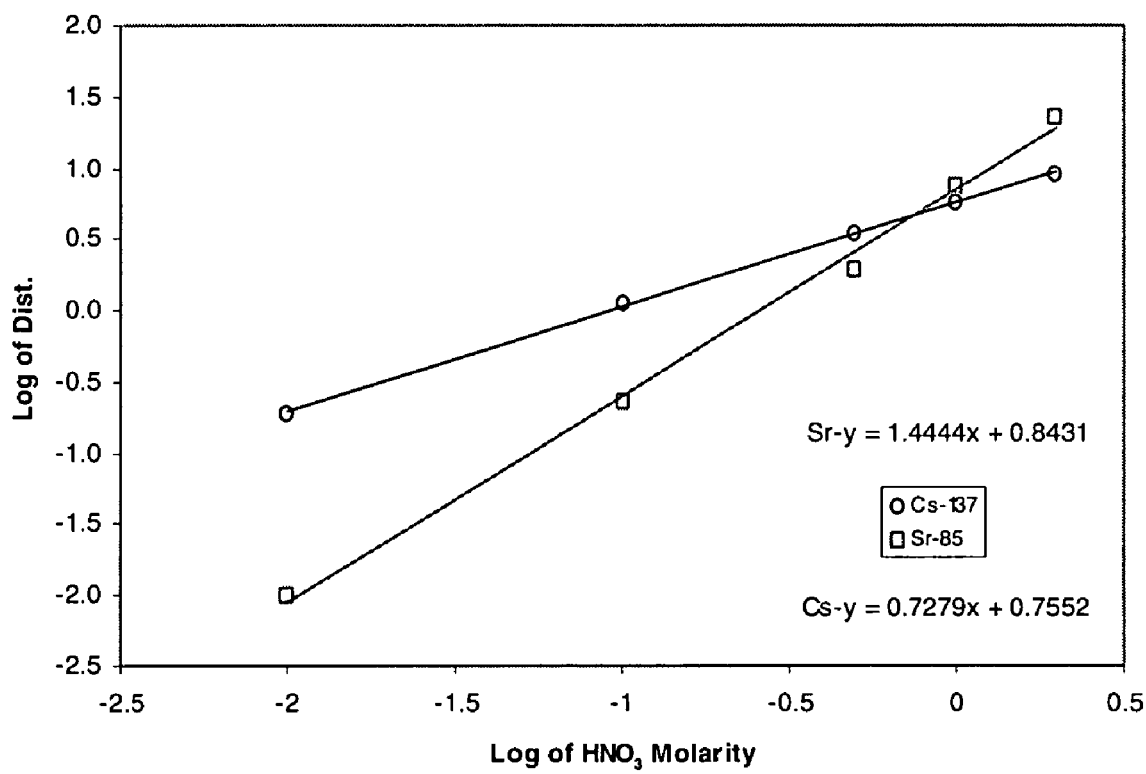
FIG. 6 shows the nitric acid dependency at ambient temperature (approximately 23° C.) of an embodiment of a mixed extractant solvent that includes DtBu18C6, BOBCalixC6, and Cs-7SB.

Nitric acid dependency tests were performed at ambient temperature (approximately 23° C.) on the mixed extractant solvent described in Example 5. Varying concentrations of $HNO_3$, from 0.01M to 2M, were mixed in equal proportions with the mixed extractant solvent. The nitric acid dependency test was performed in a manner similar to that described in Comparative Example 2. The results of the nitric acid dependency are shown in FIG. 6 and Table 5.

TABLE 5

Forward Distribution Ratios for Cesium and Strontium in Varied $HNO_3$ Concentrations.

| $HNO_3$ Concentration (M) | $D_{Cs}$ | $D_{Sr}$ |
|---|---|---|
| 0.01 | 0.19 | 0.01 |
| 0.1 | 1.14 | 0.23 |
| 0.5 | 3.44 | 1.98 |
| 1.0 | 5.66 | 7.37 |
| 2.0 | 9.26 | 20.8 |

The crossover point, the molarity at which both the forward distribution of cesium and strontium is equal to or greater than approximately 1, is approximately 0.3M. The forward distribution of cesium is equal to or greater than approximately 1 at a lower molarity of 0.1 M.

In summary, the mixed extractant solvent has been shown to simultaneously remove cesium and strontium from acidic solutions. The distribution ratios ($D_{Cs}$ and $D_{Sr}$) achieved using the mixed extractant solvent are significantly higher than the distribution ratios of the SREX solvent or the CSSX solvent used alone or in a 1:1 volume ratio.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of separating cesium and strontium from an acidic solution, comprising:
   contacting an acidic solution comprising cesium and strontium with a mixed extractant solvent consisting of calix[4]arene-bis-(tert-octylbenzo)-crown-6 ("BOB-CalixC6"), 4',4',(5')-di-(t-butyldicyclo-hexano)-18-crown-6 ("DtBu 18C6"), and 1-(2,2,3,3-tetrafluoropropoxy)-3-(4-sec-butylphenoxy)-2-propanol ("Cs-7SB") dissolved in a diluent; and
   removing the cesium and strontium from the acidic solution.

2. The method of claim 1, wherein contacting an acidic solution comprising cesium and strontium with a mixed extractant solvent comprises providing the acidic solution comprising from approximately 0.5M to approximately 3M nitric acid.

3. The method of claim 1, wherein contacting an acidic solution comprising cesium and strontium with a mixed solvent extractant comprises contacting the acidic solution with the mixed extractant solvent comprising from approximately 0.0025M to approximately 0.025M BOBCalixC6.

4. The method of claim 1, wherein contacting an acidic solution comprising cesium and strontium with a mixed solvent extractant comprises contacting the acidic solution with the mixed extractant solvent comprising from approximately 0.01M to approximately 0.5M DtBu18C6.

5. The method of claim 1, wherein contacting an acidic solution comprising cesium and strontium with a mixed solvent extractant comprises contacting the acidic solution with the mixed extractant solvent comprising from approximately 0.086 M to approximately 0.108 M DtBu18C6.

6. The method of claim 1, wherein contacting an acidic solution comprising cesium and strontium with a mixed solvent extractant comprises contacting the acidic solution with the mixed extractant solvent comprising from approximately 0.2M to approximately 1.0M Cs-7SB.

7. The method of claim 1, wherein contacting an acidic solution comprising cesium and strontium with a mixed solvent extractant comprises contacting the acidic solution with the mixed extractant solvent comprising a diluent that includes an isoparaffinic hydrocarbon.

8. The method of claim 1, wherein contacting an acidic solution comprising cesium and strontium with a mixed solvent extractant comprises contacting the acidic solution with the mixed extractant solvent consisting of approximately 0.15M DtBu18C6, approximately 0.007M BOB-CalixC6, and approximately 0.75M Cs-7SB modifier dissolved in an isoparaffinic hydrocarbon diluent.

9. The method of claim 1, wherein contacting an acidic solution comprising cesium and strontium with a mixed extractant solvent comprises forming a first organic phase and a first aqueous phase.

10. The method of claim 1, wherein contacting an acidic solution comprising cesium and strontium with a mixed extractant solvent comprises extracting the cesium and strontium into a first organic phase.

11. The method of claim 1, wherein removing the cesium and strontium from the acidic solution comprises separating a first organic phase and a first aqueous phase.

12. The method of claim 1, wherein removing the cesium and strontium from the acidic solution comprises removing the cesium and strontium at a temperature ranging from approximately 1° C. to approximately 40° C.

13. The method of claim 1, wherein removing the cesium and strontium from the acidic solution comprises removing the cesium and strontium at a temperature ranging from approximately 10° C. to approximately 15° C.

14. The method of claim 1, further comprising recovering the mixed extractant solvent, the cesium, and the strontium.

15. The method of claim 14, wherein recovering the mixed extractant solvent, the cesium, and the strontium comprises contacting a first organic phase with a second aqueous phase.

16. The method of claim 15, wherein contacting a first organic phase with a second aqueous phase comprises extracting the cesium and strontium into the second aqueous phase.

17. The method of claim 15, wherein contacting a first organic phase with a second aqueous phase comprises contacting the first organic phase with the second aqueous phase at a temperature ranging from approximately 10° C. to approximately 60° C.

18. The method of claim 15, wherein contacting a first organic phase with a second aqueous phase comprises contacting the first organic phase with the second aqueous phase at a temperature ranging from approximately 20° C. to approximately 40° C.

19. The method of claim 15, wherein contacting a first organic phase with a second aqueous phase comprises contacting the first organic phase with an aqueous solution comprising from approximately 0.001M nitric acid to approximately 0.5M nitric acid.

20. The method of claim 14, wherein recovering the mixed extractant solvent, the cesium, and the strontium comprises separating a first organic phase and a second aqueous phase.

21. A method of extracting strontium, comprising:
    contacting an acidic solution comprising strontium with a solvent comprising 4',4',(5')-di-(t-butyldicyclo-hexano)-18-crown-6 ("DtBu 18C6"), 1-(2,2,3,3-tetrafluoropropoxy)-3-(4-sec-butylphenoxy)-2-propanol ("Cs-7SB"), and an isoparaffinic hydrocarbon.

* * * * *